(12) United States Patent
Moritani

(10) Patent No.: US 11,773,955 B2
(45) Date of Patent: Oct. 3, 2023

(54) ROTATING COMPONENT AND METHOD FOR MANUFACTURING THE SAME

(71) Applicant: DENSO CORPORATION, Kariya (JP)

(72) Inventor: Yuichiro Moritani, Kariya (JP)

(73) Assignee: DENSO CORPORATION, Kariya (JP)

(*) Notice: Subject to any disclaimer, the term of this patent is extended or adjusted under 35 U.S.C. 154(b) by 133 days.

(21) Appl. No.: 17/355,597

(22) Filed: Jun. 23, 2021

(65) Prior Publication Data

US 2022/0003302 A1 Jan. 6, 2022

(30) Foreign Application Priority Data

Jul. 1, 2020 (JP) .................... 2020-114405

(51) Int. Cl.
| | |
|---|---|
| *F16H 55/06* | (2006.01) |
| *B29C 45/14* | (2006.01) |
| *F16K 31/53* | (2006.01) |
| *B29L 31/00* | (2006.01) |
| *F02M 26/53* | (2016.01) |
| *B29L 15/00* | (2006.01) |

(52) U.S. Cl.
CPC ....... *F16H 55/06* (2013.01); *B29C 45/14467* (2013.01); *B29L 2015/003* (2013.01); *B29L 2031/7506* (2013.01); *F02M 26/53* (2016.02); *F16H 2055/065* (2013.01); *F16K 31/535* (2013.01)

(58) Field of Classification Search
CPC ......... F16H 2055/065; B29L 2015/003; B29L 2031/7506; F02M 26/53; F16K 31/535
See application file for complete search history.

(56) References Cited

U.S. PATENT DOCUMENTS

| | | | | |
|---|---|---|---|---|
| 2007/0290680 | A1* | 12/2007 | Hattori | G01D 5/145 324/207.25 |
| 2008/0296804 | A1* | 12/2008 | Colli | F16K 1/22 264/274 |
| 2011/0056460 | A1* | 3/2011 | Kondo | F02D 9/1065 264/328.8 |
| 2012/0297766 | A1* | 11/2012 | Inagaki | F02M 26/11 123/568.24 |
| 2013/0140477 | A1* | 6/2013 | Shimane | H02K 7/116 310/83 |
| 2014/0339011 | A1* | 11/2014 | Beyerlein | B23P 15/14 180/444 |
| 2022/0397069 | A1* | 12/2022 | Sakakibara | F02D 9/1065 |
| 2022/0412466 | A1* | 12/2022 | Takeuchi | F02D 9/107 |

FOREIGN PATENT DOCUMENTS

| | | | | |
|---|---|---|---|---|
| DE | 10127224 A1 | * 12/2002 | ............. | B29D 15/00 |
| JP | 05-319080 | 12/1993 | | |
| JP | 2017-133437 | 8/2017 | | |

* cited by examiner

*Primary Examiner* — Terence Boes
(74) *Attorney, Agent, or Firm* — Nixon & Vanderhye P.C.

(57) ABSTRACT

A rotating component includes a metal plate fixed to an end portion of the metal shaft, and a resin valve gear integrally formed with the plate by insert molding. The plate is formed with a circular fitting hole that fits with the end portion of the shaft, and a positioning recess that is recessed from one side to the other side of the plate.

8 Claims, 15 Drawing Sheets

ROTATING COMPONENT AND METHOD FOR MANUFACTURING THE SAME

CROSS REFERENCE TO RELATED APPLICATION

The present application is based on Japanese Patent Application No. 2020-114405 filed on Jul. 1, 2020, disclosure of which is incorporated herein by reference.

TECHNICAL FIELD

The present disclosure relates to a rotating component and a method for manufacturing the rotating component.

BACKGROUND

The rotating component includes a metal plate integrated with a resin gear made of resin by insert molding, and a metal shaft fixed to the plate.

SUMMARY

An object of the present disclosure is to prevent rotation of the plate when the plate and the resin gear are integrally formed by insert molding.

In order to achieve the above object, a rotating component includes a metal shaft rotatably supported around an axis, a metal plate fixed to an end portion of the shaft, and a resin gear made of resin formed integrally with the plate by insert molding. Further, the plate is formed with a circular fitting hole that fits with the end portion of the shaft, and a positioning recess that is recessed from one side to the other side of the plate. A cross section of the end portion of the shaft has a circular shape, and the end portion of the shaft is fitted into the fitting hole.

A method for manufacturing a rotating component includes following steps:

a step of preparing a metal plate, the metal plate being formed with a circular fitting hole that fits with an end portion of a shaft, and a positioning recess that is recessed from one side to the other side of the plate;

a step of preparing a lower mold, the lower mold having a first protrusion for fitting with the fitting hole of the plate and a second protrusion for fitting with the positioning recess while being formed so as to extend in one direction from the bottom surface side;

a step of arranging the plate so that the fitting hole of the plate is fitted into the first protrusion of the lower mold and the positioning recess is fitted into the second protrusion; and a step of forming integrally the plate and a resin gear made of resin by enclosing the plate and arranging an upper mold so as to face the lower mold, and by injecting resin into a space formed between the lower mold and the upper mold.

DETAILED DESCRIPTION

Figure 1:
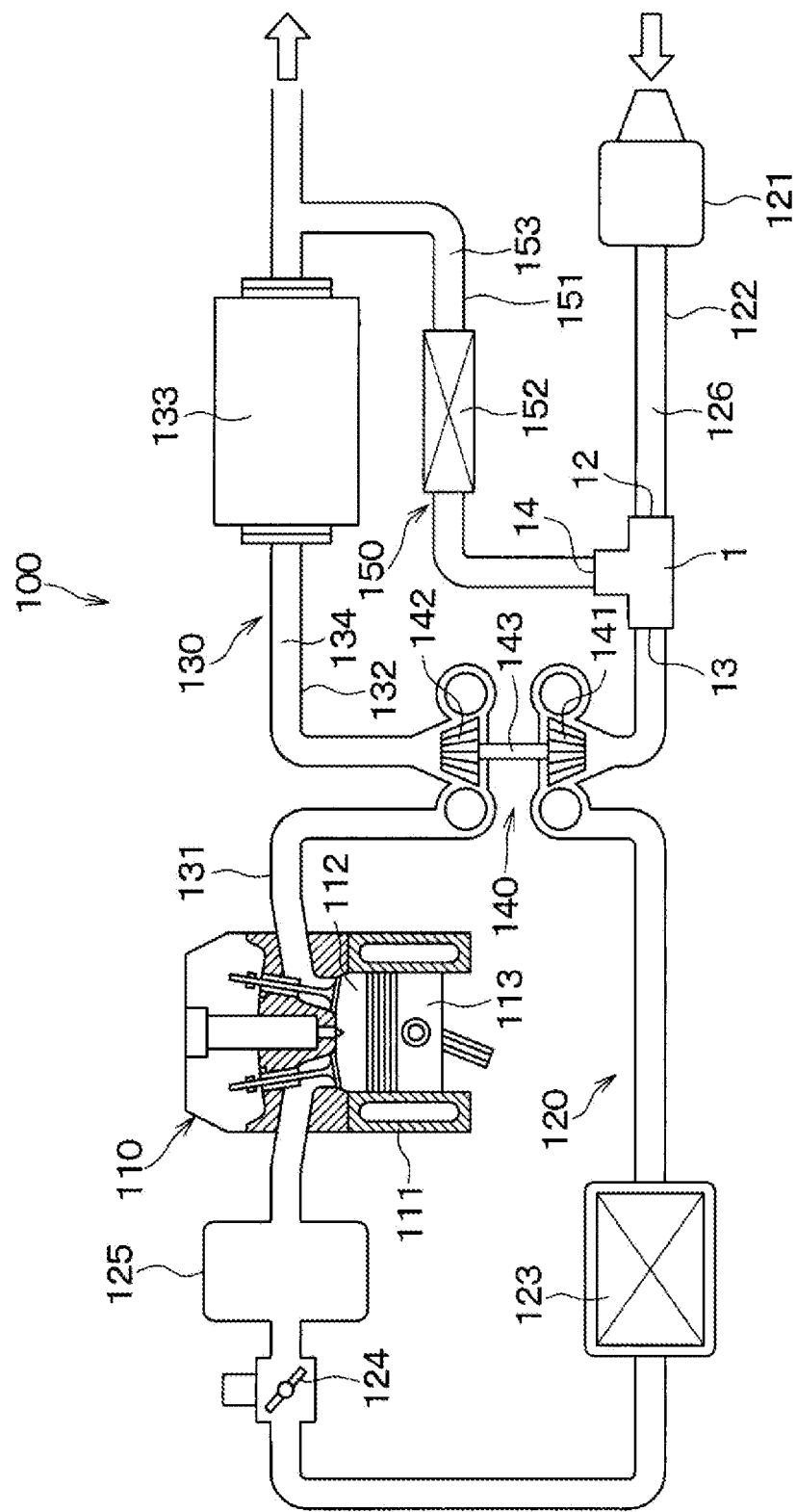
FIG. 1 is a configuration diagram of an engine system in which a valve device according to a first embodiment is used.
Figure 2:
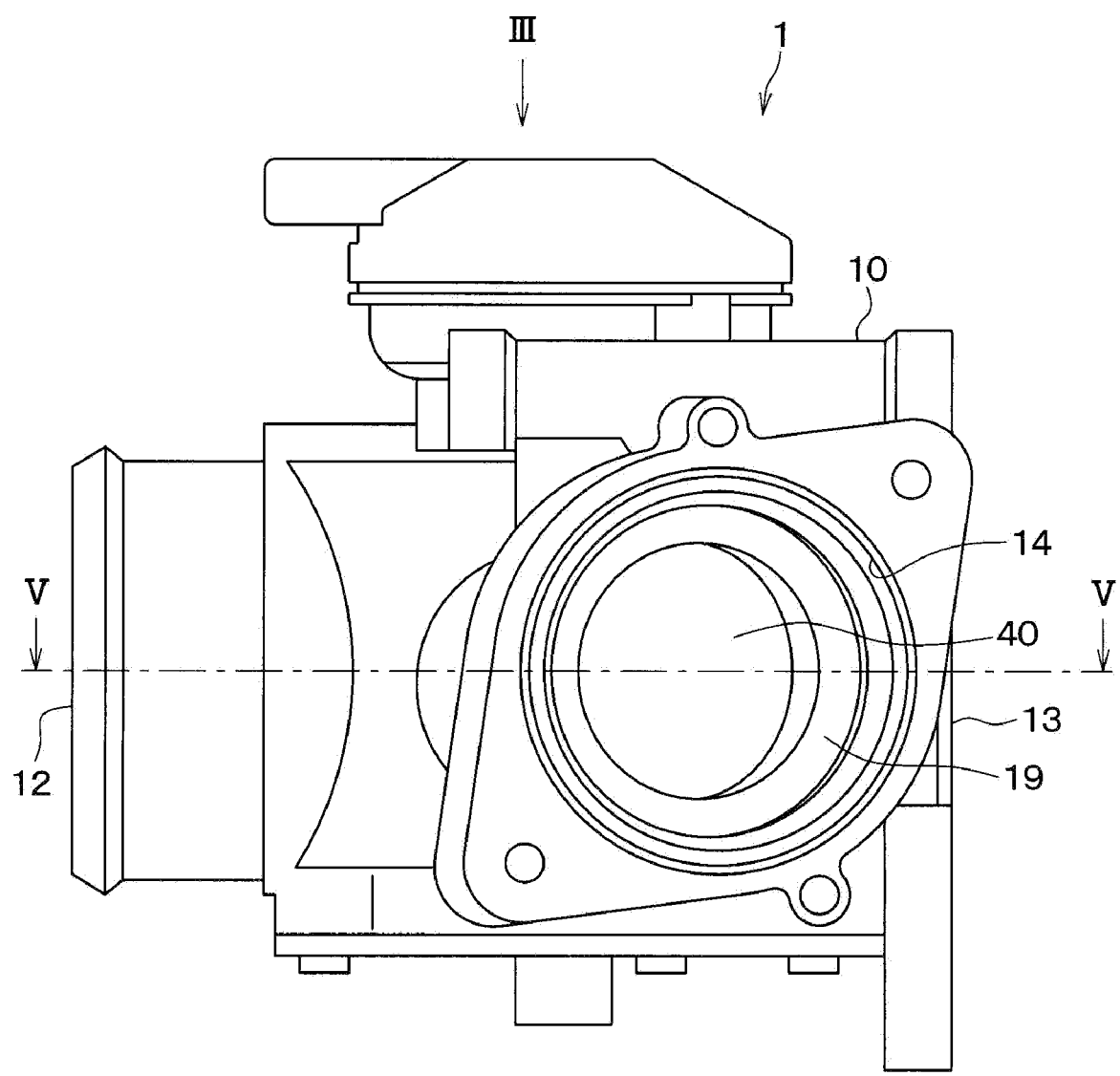
FIG. 2 is an external view of the valve device according to the first embodiment.
Figure 3:
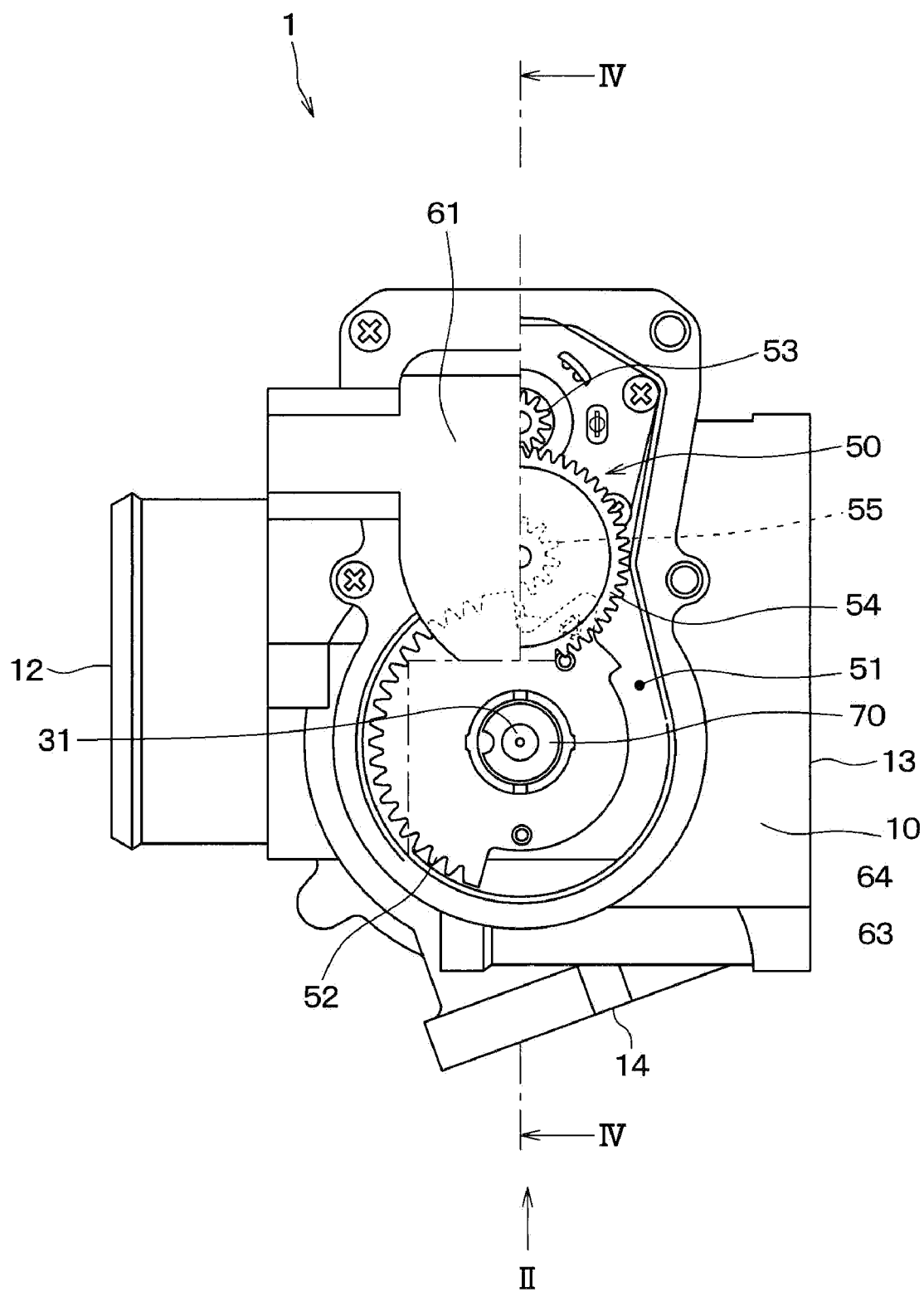
FIG. 3 is a plan view excluding a part of a sensor cover when viewed from a direction III of FIG. 2.

In an assumable example, a rotating component includes a metal plate integrated with a resin gear made of resin by insert molding, and a metal shaft fixed to the plate.

In a method for manufacturing the rotating component, first, a fixed side portion of a metal shaft is inserted into a through hole formed in the plate, and after positioning the fixed side portion, the fixed side portion of the metal shaft protruding from an end surface of the plate is pressurized in an axial direction. By this pressurization, the tip of the fixed side portion is plastically deformed in an external direction, and the metal shaft is crimped and fixed to the plate.

The through hole formed in the plate is formed with a plurality of recesses recessed in an outer diameter direction and protrusions bulging in an inner diameter direction. Then, a part of the fixed side portion of the metal shaft bites into the inside of the plate recess by a caulking process, so that the fixed side portion of the metal shaft is fixed to the plate.

In the assumable example, a plurality of plate protrusions formed in through holes of the plate come into contact with the metal shaft at a plurality of locations in a circumferential direction of the fixed side portion of the metal shaft. Therefore, a fastening strength between the metal shaft and the plate cannot be sufficiently secured.

Therefore, in order to improve the fastening strength between the metal shaft and the plate, the inventor studied that a shape of the cross section orthogonal to the axial direction of the fixed side portion of the metal shaft and a shape of the through hole of the plate are configured to be circular, respectively. As a result, the contact area between the metal shaft and the plate can be made larger, and the fastening strength between the metal shaft and the plate can be secured.

However, in such a configuration in which the shape of the through hole of the plate is circular, it is difficult to fix the plate so that it does not rotate when the plate is insert-molded into the resin gear. Therefore, the plate rotates due to the molding pressure.

As described above, if the plate rotates during insert molding, there arises a problem that, for example, a processing accuracy of the gear teeth of the resin gear is lowered.

In the above configuration, since a plurality of plate recesses are formed in the plate, it is possible to prevent the plate from rotating when insert molding by using these plate recesses. However, the fastening strength between the metal shaft and the plate cannot be sufficiently secured.

The present disclosure has been made in view of the above points, and an object of the present disclosure is to prevent rotation of the plate when the plate and the resin gear are integrally formed by insert molding.

In order to achieve the above object, the rotating component includes a metal shaft rotatably supported around an axis, a metal plate fixed to an end portion of the shaft, and a resin gear made of resin formed integrally with the plate by insert molding. Further, the plate is formed with a circular fitting hole that fits with the end portion of the shaft, and a positioning recess that is recessed from one side to the other side of the plate. A cross section of the end portion of the shaft has a circular shape, and the end portion of the shaft is fitted into the fitting hole.

According to such a configuration, since the plate is formed with the positioning recess recessed from one surface side to the other surface side of the plate, the plate can be fixed by using the positioning recess. Therefore, it is possible to prevent the plate from rotating when the plate and the resin gear are integrally formed by insert molding.

A method for manufacturing a rotating component includes following steps:

a step of preparing a metal plate, the metal plate being formed with a circular fitting hole that fits with an end portion of a shaft, and a positioning recess that is recessed from one side to the other side of the plate;

a step of preparing a lower mold, the lower mold having a first protrusion for fitting with the fitting hole of the plate and a second protrusion for fitting with the positioning recess while being formed so as to extend in one direction from the bottom surface side;

a step of arranging the plate so that the fitting hole of the plate is fitted into the first protrusion of the lower mold and the positioning recess is fitted into the second protrusion; and a step of forming integrally the plate and a resin gear made of resin by enclosing the plate and arranging an upper mold so as to face the lower mold, and by injecting resin into a space formed between the lower mold and the upper mold.

According to this configuration, the plate and the resin gear are integrally formed by injecting resin into the space formed between the lower mold and the upper mold, in a state where the plate is arranged so that the fitting hole of the plate is fitted into the first protrusion of the lower mold and the positioning recess is fitted into the second protrusion.

Therefore, it is possible to prevent the plate from rotating when the plate and the resin gear are integrally formed by insert molding.

Hereinafter, a plurality of embodiments of the present disclosure will be described with reference to the drawings. In the following embodiments, the same or equivalent parts are denoted by the same reference numerals as each other, and explanations will be provided to the same reference numerals.

First Embodiment

A rotating device according to the first embodiment will be described with reference to the drawings. As shown in FIG. 1, the rotating device of the present embodiment is used for a valve device 1 constituting an engine system 100 shown in FIG. 1. The valve device 1 is used, for example, as an EGR valve of the engine system 100 in a vehicle. EGR is an abbreviation for Exhaust gas recirculation.

First, the engine system 100 in which the valve device 1 is used will be described. The engine system 100 includes an engine 110, an intake system 120, an exhaust system 130, a supercharger 140, an exhaust recirculation system 150, and the like.

The engine 110 is a well-known prime mover that obtains power for traveling the vehicle or the like. The engine 110 burns fuel in a combustion chamber 112 in a cylinder 111 and converts a reciprocating motion of a piston 113 due to a change in the volume of the combustion gas into a rotary motion by a crank mechanism.

The intake system 120 supplies the air taken into an intake pipe 122 from the outside air via an air cleaner 121 to a combustion chamber 112 of the engine 110 via a compressor 141, an intercooler 123, a throttle 124, an intake manifold 125, and the like. The air cleaner 121 removes foreign matter from the air taken in from the atmosphere. An intake passage 126 is formed inside the intake pipe 122. The intercooler 123 cools the intake air compressed by the compressor 141 and raised in temperature. The throttle 124 adjusts an intake amount of the engine 110. The intake manifold 125 has a structure that branches into the same number of passages as the cylinders 111 of the engine 110.

On the other hand, the exhaust system 130 is configured to discharge an exhaust gas discharged from the engine 110 to the outside air via an exhaust manifold 131, an exhaust pipe 132, a turbine 142 of the supercharger 140, an exhaust purification unit 133, and the like. The exhaust manifold 131 has a structure in which the same number of passages as the cylinders 111 merge. An exhaust passage 134 is formed inside the exhaust pipe 132. The exhaust purification unit 133 captures particulate matter contained in the exhaust gas, decomposes hydrocarbons, and the like.

The supercharger 140 uses the energy of the exhaust gas to compress the intake air and supercharges the pressurized air to the combustion chamber 112. The supercharger 140 has a compressor 141, a turbine 142, and a shaft 143. The turbine 142 is arranged between the engine 110 and the exhaust purification unit 133 in the exhaust system 130, and is rotationally driven by the energy of the exhaust. The shaft 143 connects the turbine 142 and the compressor 141, and rotates the turbine 142 and the compressor 141 in synchronization with each other. The compressor 141 is arranged between the air cleaner 121 and the intercooler 123 in the intake system 120 so as to compress the intake air.

The exhaust recirculation system 150 is a device that returns a part of the exhaust gas flowing through the exhaust passage 134 to the intake passage 126, and includes an EGR pipe 151, an EGR cooler 152, the valve device 1, and the like. The EGR pipe 151 connects a portion of the exhaust pipe 132 downstream of the exhaust purification unit 133 to the valve device 1. An EGR passage 153 is formed inside the EGR tube 151. In the following description, the exhaust gas flowing through the EGR pipe 151 is referred to as EGR gas. The EGR cooler 152 is provided in a middle of the EGR pipe 151 and cools the EGR gas passing through the EGR passage 153. The valve device 1 is provided at a portion of the intake pipe 122 between the air cleaner 121 and the compressor 141, and constitutes a connection portion between the intake pipe 122 and the EGR pipe 151. The valve device 1 increases or decreases the flow rate of the EGR gas returned to the intake passage 126 through the EGR passage 153.

Next, the configuration of the valve device 1 will be described.

As shown in FIGS. 2 to 5, the valve device 1 includes a housing 10, a shaft 30, a valve body 40, a reduction mechanism 50, a motor 60, and the like.

The housing 10 has a fluid passage 11 through which intake air and EGR gas flow. An upstream side connection port 12, a downstream side connection port 13, and an EGR connection port 14 are provided at the end of the fluid passage 11. As shown in FIG. 1, a pipe extending from the air cleaner 121 side of the intake pipe 122 is connected to the upstream side connection port 12. A pipe extending to the compressor 141 side of the intake pipe 122 is connected to the downstream side connection port 13. The EGR pipe 151 is connected to the EGR connection port 14. Therefore, the housing 10 forms a confluence of the intake pipe 122 and the EGR pipe 151.

Figure 5:
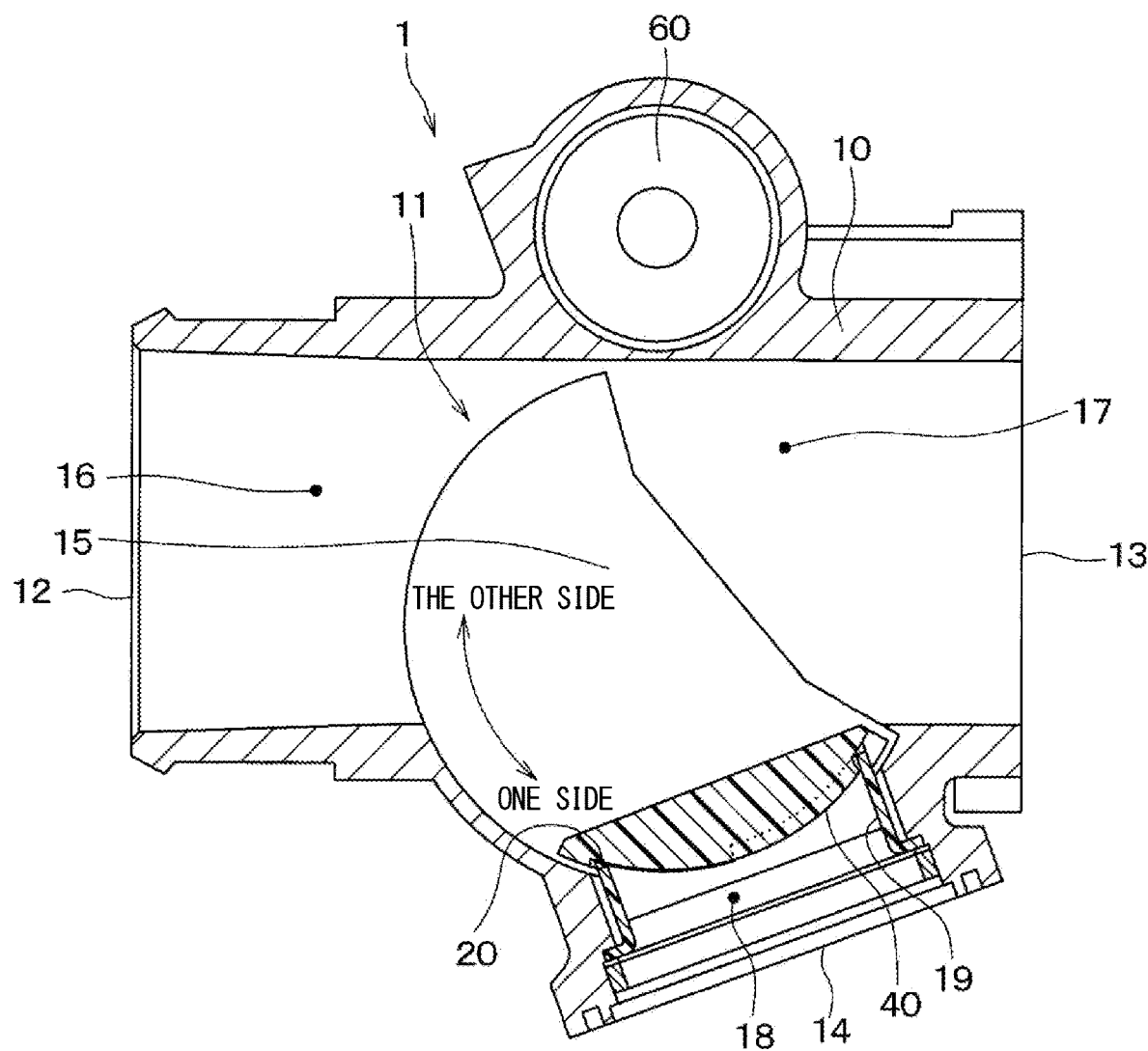
FIG. 5 is a cross-sectional view taken along a line V-V of FIG. 4.

As shown in FIG. 5, a valve chamber 15 for rotatably accommodating the valve body 40 is formed inside the housing 10. A flow path communicating the upstream side connection port 12 and the valve chamber 15 is referred to as an upstream side passage 16. A flow path communicating the downstream side connection port 13 and the valve chamber 15 is referred to as a downstream side passage 17. A flow path communicating the EGR connection port 14 and the valve chamber 15 is referred to as an EGR passage 18. The valve chamber 15, the upstream side passage 16, the downstream side passage 17, and the EGR passage 18 are all part of the fluid passage 11.

Figure 4:
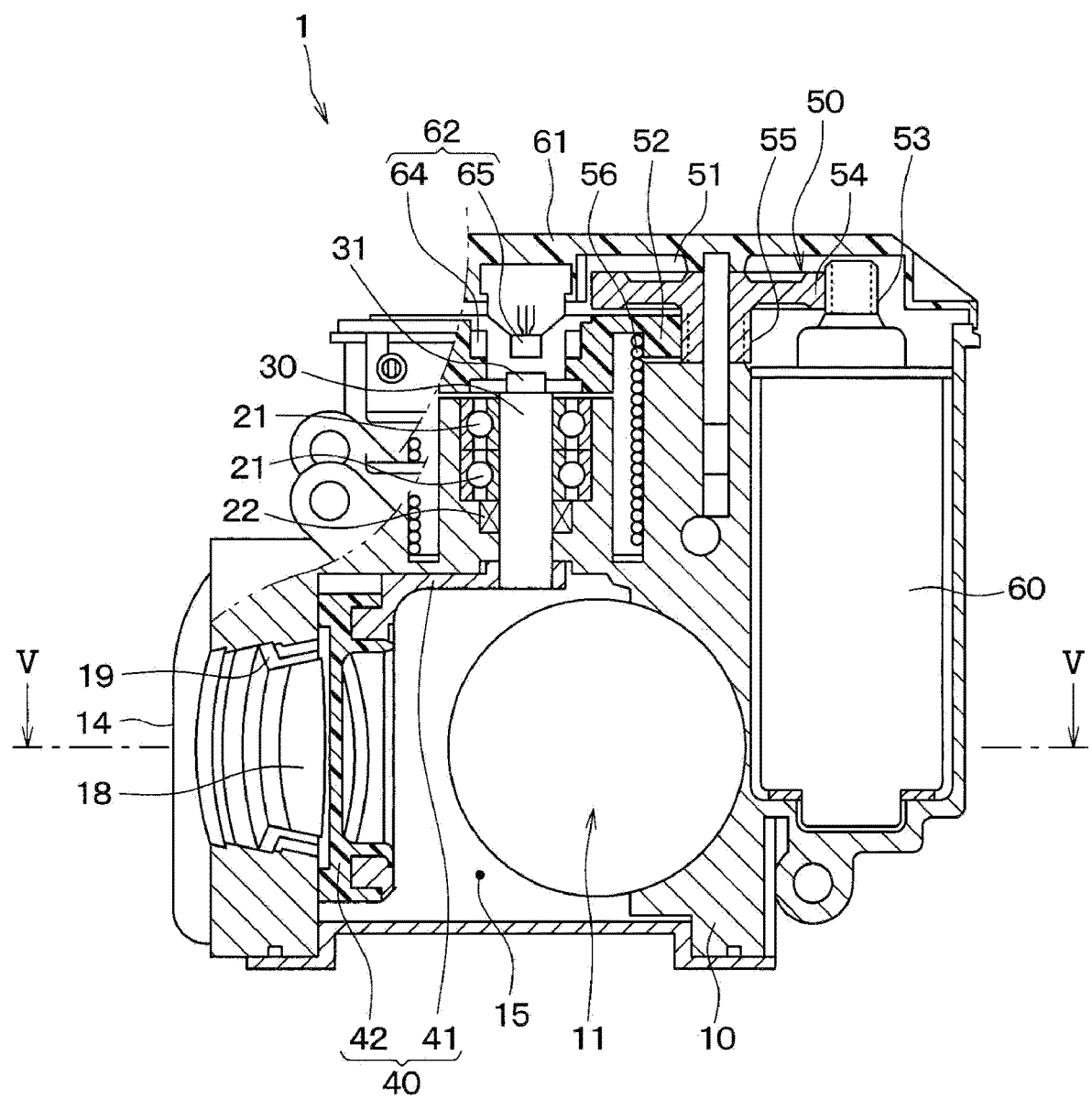
FIG. 4 is a cross-sectional view taken along a line IV-IV of FIG. 3.

A tubular valve seat member 19 is provided inside the EGR passage 18. A valve seat 20 on which the valve body 40 is seated and released is provided in an opening of the valve seat member 19 on the valve chamber 15 side. FIGS. 4 and 5 show a state in which the valve body 40 is seated on the valve seat 20 and closes the EGR passage 18. In this state, the valve body 40 blocks the flow of EGR gas from the EGR pipe 151 to the intake pipe 122 and allows the flow of the intake air of the intake pipe 122.

As shown in FIG. 4, the shaft 30 is rotatably supported with respect to the housing 10 by a bearing 21. The seal member 22 is provided at a position on the shaft 30 on the valve chamber 15 side with respect to the bearing 21. The seal member 22 is fixed to the housing 10 and slides on an outer periphery of the shaft 30 so as to seal between a drive chamber 51 provided with a speed reduction mechanism 50 and the fluid passage 11.

As shown in FIGS. 4 to 5, the valve body 40 has a fan-shaped arm 41 to which the shaft 30 is fixed, and a valve body 42 extending in a plate shape curved in the axial direction from an outer edge portion of the arm 41 opposite to the shaft 30. The valve body 42 is formed in a substantially arc shape in a cross section perpendicular to the axis of the shaft 30. The valve body 40 is configured such that an outer wall surface of the valve body 42 can be seated on and off the valve seat 20.

Figure 6:
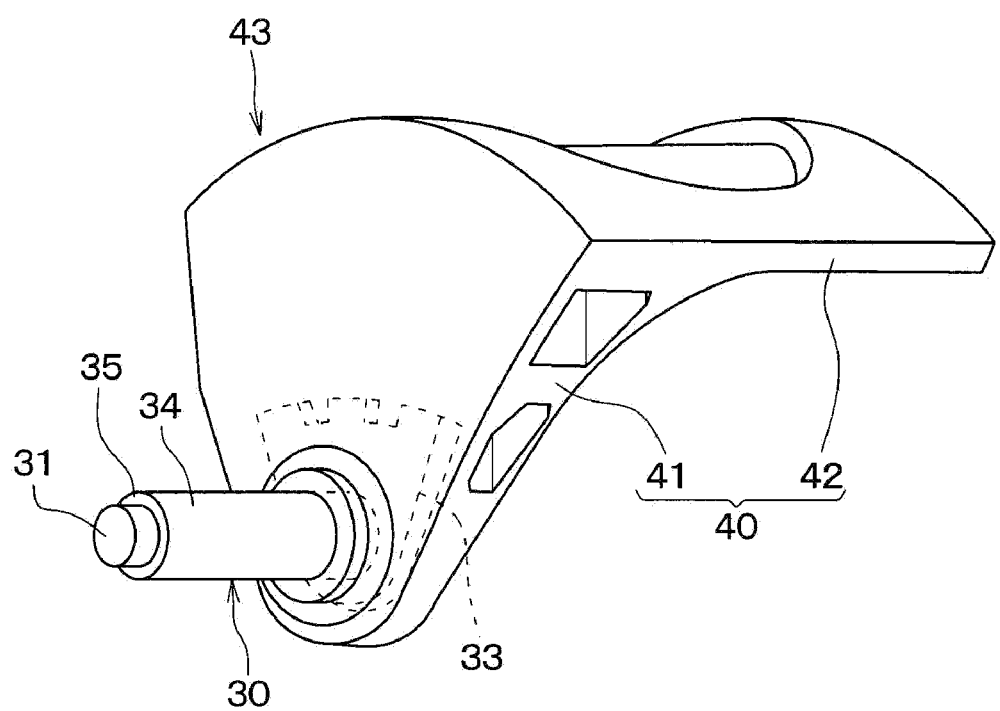
FIG. 6 is a perspective view of a valve subassembly of the first embodiment.

As shown in FIG. 6, the shaft 30 and the valve body 40 are integrally formed by insert molding. Therefore, in the valve chamber 15, the shaft 30 and the valve body 40 are integrally rotationally driven. The shaft 30 is made of metal, and the valve body 40 is made of resin. In the following description, the one in which the shaft 30 and the valve body 40 are integrally formed is referred to as a valve subassembly 43.

The shaft 30 has a plate 33 having a shape extending radially outward from the center of the shaft 30 at a portion to be inserted into the valve body 40. The plate 33 is fixed to the portion of the shaft 30 to be inserted into the valve body 40 so as not to rotate relative to each other, and is molded into the valve body 40. The plate 33 is a member for increasing the coupling strength between the shaft 30 and the valve body 40. The plate 33 is made of, for example, metal.

As shown in FIG. 4, a reduction mechanism 50 composed of a plurality of gears and the like is provided in a drive chamber 51 provided on one side of the shaft 30 in the axial direction. The reduction mechanism 50 reduces a rotational speed of the motor 60, amplifies the torque of the motor 60, and transmits the torque to the shaft 30. Specifically, the reduction mechanism 50 includes a pinion gear 53 provided on an output shaft of the motor 60, an intermediate gear 54 that meshes with the pinion gear 53, a small-diameter gear 55 provided coaxially with the intermediate gear 54, and a valve gear 52 that meshes with the small-diameter gear 55. The valve gear 52 corresponds to a resin gear made of resin. The valve gear 52 is fixed to the end portion 31 of the shaft 30 so as not to rotate relative to each other. Further, the valve gear 52 is urged by the return spring 56 in a direction in which the valve body 40 is seated on the valve seat 20, that is, on one side indicated by an arrow in FIG. 5.

As shown in FIG. 6, a portion of the shaft 30 between the end portion 31 into which the valve gear 52 is fitted and the portion inserted into the valve body 40 is referred to as a shaft intermediate portion 34. An outer diameter of the end portion 31 of the shaft 30 is formed to be smaller than the outer diameter of the shaft intermediate portion 34. Therefore, a step portion 35 is provided between the end portion 31 of the shaft 30 and the shaft intermediate portion 34. When the valve gear 52 is fitted to the end portion 31 of the shaft 30, a surface of the valve gear 52 on the valve body 40 side comes into contact with the step portion 35 of the shaft 30. The valve gear 52 is fixed to the end portion 31 of the shaft 30.

Figure 7:
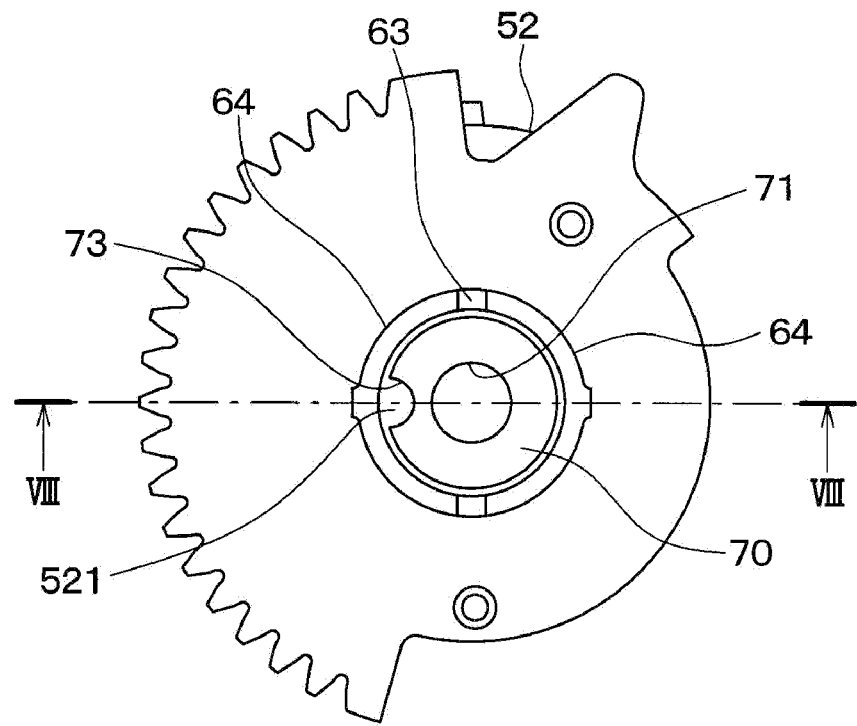
FIG. 7 is a plan view of a valve gear.

FIG. 7 is a plan view of the valve gear 52. The valve gear 52 is integrally formed with a plate-shaped metal plate 70, a metal magnet 63, and a metal yoke 64 by insert molding.

Figure 9:
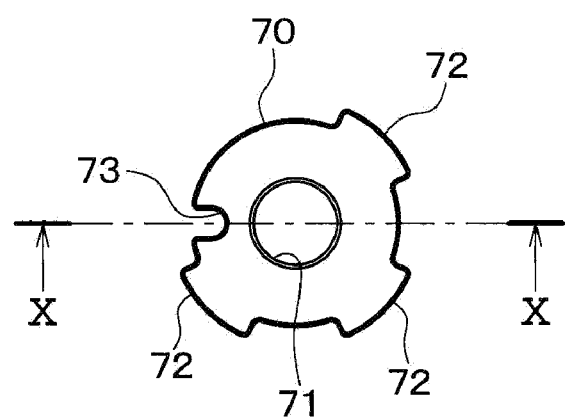
FIG. 9 is a front view of a plate.
Figure 10:
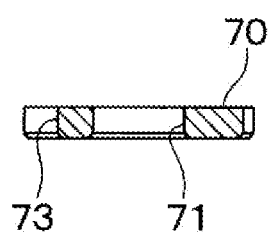
FIG. 10 is a cross-sectional view taken along a line X-X in FIG. 9.

As shown in FIGS. 9 and 10, the plate 70 is formed with a fitting hole 71 that fits into the end portion 31 of the shaft 30. Further, the plate 70 is formed with three detent portions 72 and one positioning recess 73.

The detent portions 72 are formed so as to project outward in the radial direction of the plate 70. Further, the positioning recess 73 is formed so as to be recessed from one surface side to the other surface side of the plate 70. Further, the positioning recess 73 is formed so as to be recessed from the outer peripheral side of the plate 70 toward the center side of the plate 70 on the radial outer side of the fitting hole 71. Further, the positioning recess 73 of the present embodiment is formed so as to penetrate between one surface side and the other surface side of the plate 70. A filling portion 521 is formed inside the positioning recess 73 of the plate 70 by the filled resin.

The fitting hole 71 has a circular shape. Therefore, at the time of assembly, the end portion 31 of the shaft 30 and the valve gear 52 are fitted in a relatively rotatable state. In such a state, it is possible to position the shaft 30 and the valve gear 52 in the rotational direction.

Figure 8:
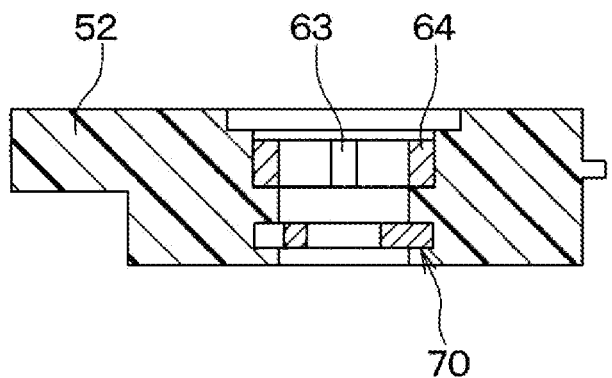
FIG. 8 is a cross-sectional view taken along a line VIII-VIII in FIG. 7.

As shown in FIGS. 7 and 8, in the valve gear 52, a yoke 64 and a magnet 63 for forming a magnetic circuit are integrated by insert molding. The yoke 64 and the magnet 63 are arranged radially outside a predetermined radius R centered on a center line of the fitting hole 71 that coincides with the axis of the shaft 30. Further, the positioning recess 73 is arranged radially inside the predetermined radius R centered on the center line of the fitting hole 71.

Figure 18:
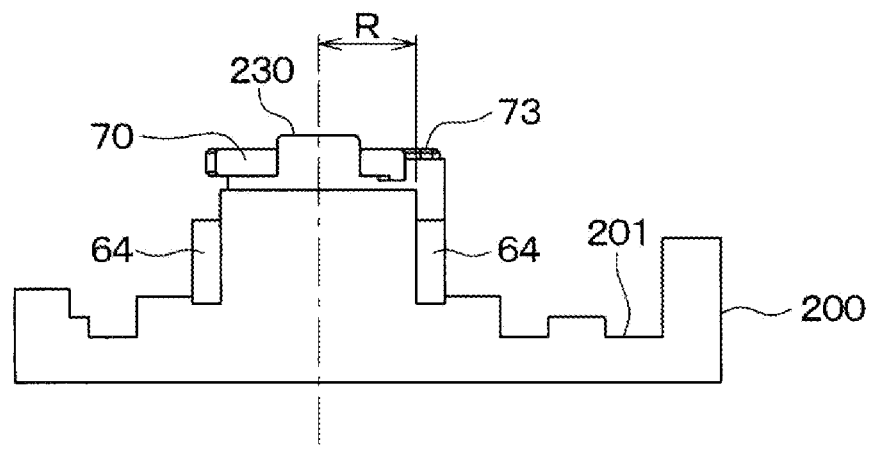
FIG. 18 is a diagram showing an example in which positioning recesses are arranged radially outside a predetermined radius centered on a center line of a fitting hole.

In the above configuration, it is possible to remove the lower mold 200 after injection molding. On the other hand, as shown in FIG. 18, when the positioning recess 73 is arranged radially outside the predetermined radius R centered on the center line of the fitting hole 71, it becomes impossible to remove the lower mold 200 after injection molding.

Figure 11:
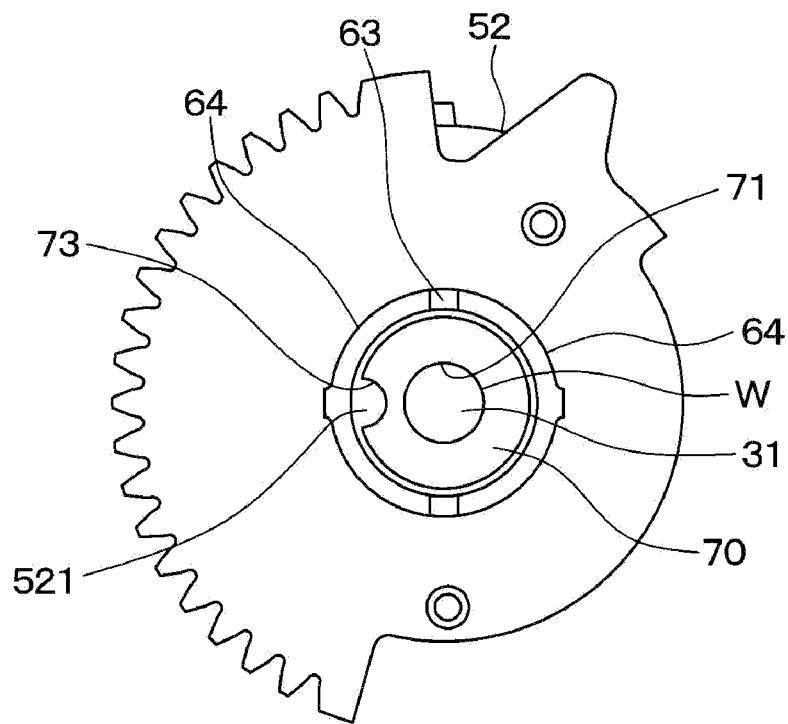
FIG. 11 is a plan view of a valve gear fixed to a shaft.
Figure 12:
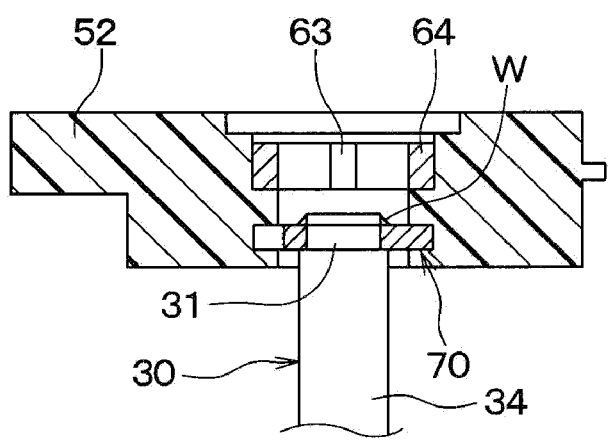
FIG. 12 is a schematic cross-sectional view of FIG. 11.
Figure 13:
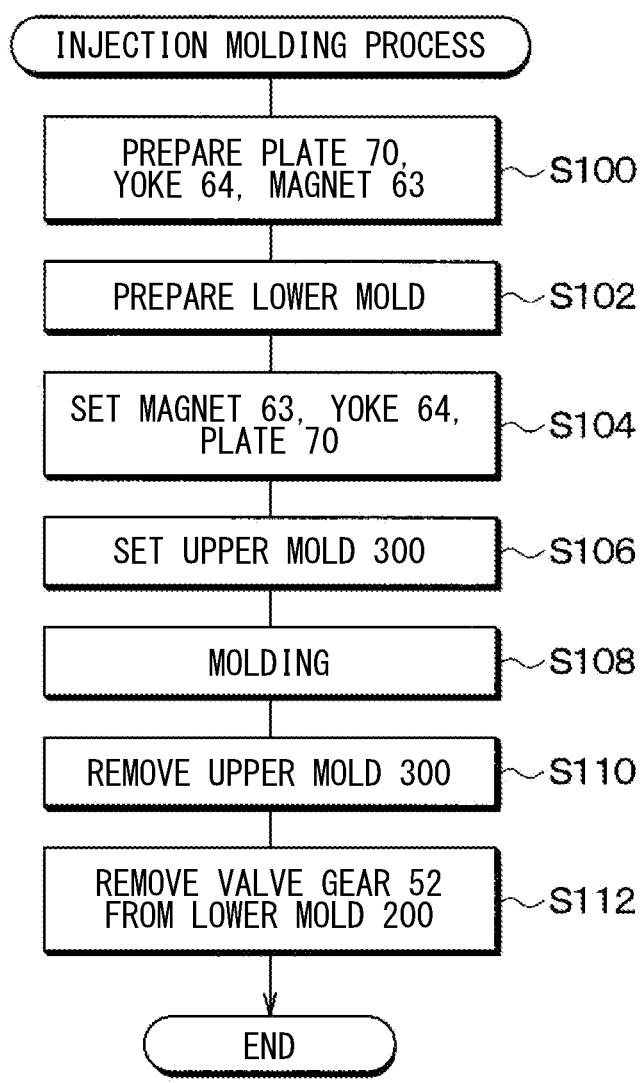
FIG. 13 is a flow chart showing an injection molding process of the valve gear.

As shown in FIGS. 11 and 12, the end portion 31 of the shaft 30 and the fitting hole 71 of the plate 70 provided in the valve gear 52 are fixed by welding. In FIGS. 11 and 12, the welded portion between the end portion 31 of the shaft 30 and the valve gear 52 is indicated by an arrow of reference numeral W. The end portion 31 of the shaft 30 and the plate 70 are welded along the outer circumference of the end portion 31 of the shaft 30 in a state where the end portion 31 of the shaft 30 is fitted into the fitting hole 71 of the plate 70.

A motor 60 is housed in the housing 10. The motor 60 is an electric motor that outputs torque when energized. When the motor 60 is driven, the torque of the motor 60 is transmitted to the shaft 30 via the reduction mechanism 50. When the shaft 30 rotates around the axis, the valve body 40 integrally formed with the shaft 30 rotates in the valve chamber 15. As a result, the valve body 40 increases or decreases the opening area of the EGR passage 18 and the opening area of the upstream side passage 16.

As described above, FIGS. 4 and 5 show a state in which the valve body 40 is seated on the valve seat 20 and closes the EGR passage 18. In the above state, when the valve body 40 moves to the other side indicated by the arrow in FIG. 5, the opening area of the upstream side passage 16 becomes smaller and the opening area of the EGR passage 18 becomes larger. As a result, the negative pressure in the downstream side passage 17 on the downstream side with respect to the valve body 40 becomes large, and the EGR gas is introduced from the EGR passage 18 into the downstream side passage 17. As described above, the valve device 1 is provided in the intake pipe 122 on the upstream side with respect to the compressor 141. Therefore, the valve device 1 not only increases the opening area of the EGR passage 18, but also reduces the opening area of the upstream side passage 16. Therefore, it is possible to effectively utilize the negative pressure generated by the operation of the piston 113 of the engine 110 and efficiently introduce the EGR gas from the EGR passage 18 into the intake pipe 122.

As shown in FIG. 4, a sensor cover 61 is provided in the drive chamber 51 of the housing 10. Inside the sensor cover 61, a sensor device 62 for detecting the rotation angle of the shaft 30 is provided. The sensor device 62 is composed of, for example, a pair of magnets 63 and a yoke 64 provided on the valve gear 52, a hole IC 65 attached to the sensor cover 61 side, and the like. The rotation angle of the shaft 30 detected by the sensor device 62 is transmitted to an electronic control device (hereinafter referred to as an ECU) (not shown). The ECU feedback-controls the amount of electricity supplied to the motor 60 so that the rotation angle of the shaft 30 detected by the sensor device 62 and the target value thereof match.

Next, the injection molding process of the valve gear 52 will be described with reference to FIGS. 13 to 18.

Next, the operator prepares the magnet 63, the yoke 64, and the plate 70 in S100. The metal plate 70 is formed with a circular fitting hole 71 that fits with the end portion 31 of the metal shaft 30, and a positioning recess 73 that is recessed from one side to the other side of the plate 70.

Figure 14:
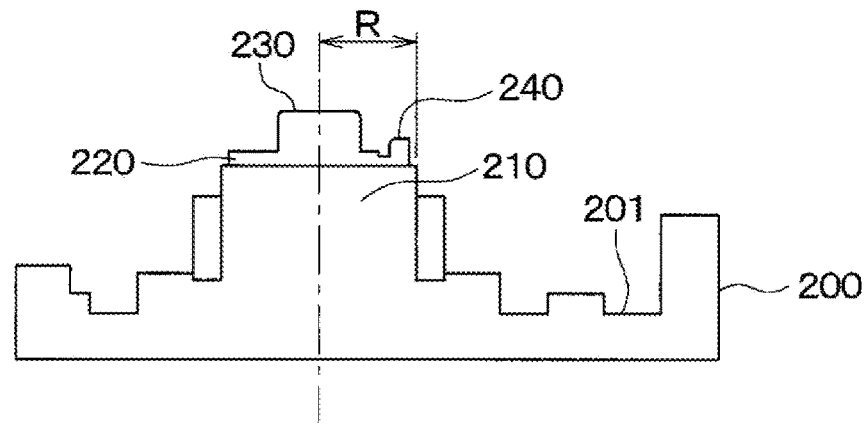
FIG. 14 is a schematic cross-sectional view of a lower mold.
Figure 16:
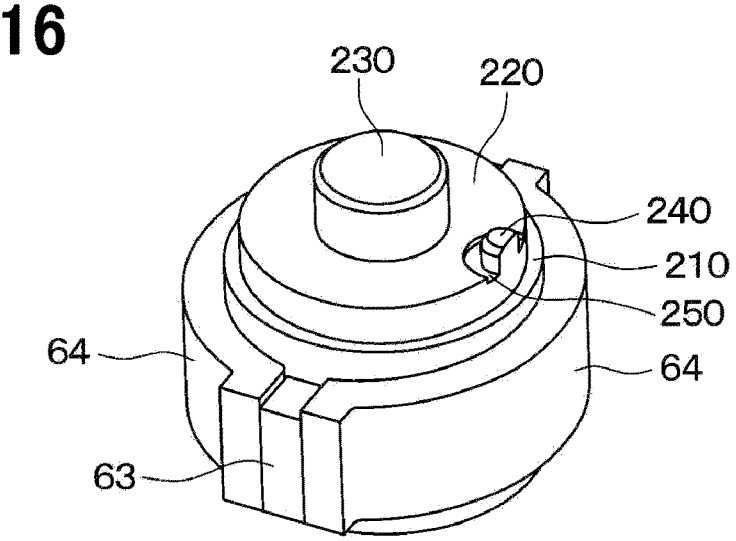
FIG. 16 is a diagram for explaining a first protrusion and a second protrusion of the lower mold.

Next, the worker prepares a lower mold 200, which is the first mold, in S102. As shown in FIGS. 14 and 16, the lower mold 200 is formed with a cylindrical large tubular portion 210 extending upward in one direction from a bottom surface 201. The tip of the large tubular portion 210 is flat.

Further, at the tip of the large tubular portion 210, a cylindrical small cylindrical portion 220 extending upward from the tip of the large tubular portion 210 is formed. The tip of the small cylindrical portion 220 is flat.

Further, at a center of the tip of the small cylindrical portion 220, a cylindrical first protrusion 230 extending upward from the tip of the small cylindrical portion 220 is formed. The tip of the first protrusion 230 is flat. The diameter of the small cylindrical portion 220 is smaller than that of the large tubular portion 210.

Further, a semi-cylindrical second protrusion 240 extending upward is formed at one end of the tip of the small cylindrical portion 220 on the outer side in the radial direction. The tip of the second protrusion 240 is flat. Further, the lower mold 200 is formed with a groove-shaped root recess 250 that is recessed downward so as to surround the root of the second protrusion 240.

Figure 15:
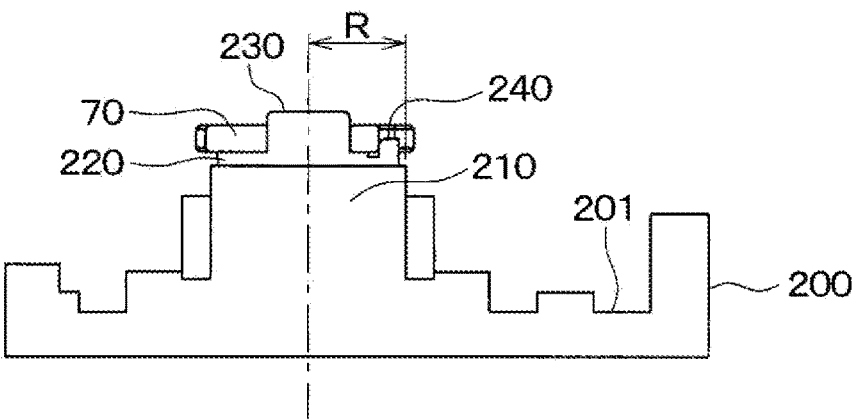
FIG. 15 is a diagram showing a state in which a magnet, a yoke, and a plate are set in the lower mold.

Next, as shown in FIGS. 15 and 16, the operator sets the magnet 63, the yoke 64 and the plate 70 on the lower mold 200. Specifically, two semicircular yokes 64 are arranged so as to interpose the large tubular portion 210, and each of magnets 63 is arranged at the two ends of each yoke 64. After that, the operator arranges the plate 70 so that the operator fits the fitting hole 71 of the plate 70 into the first protrusion 230 of the lower mold 200 and fits the positioning recess 73 into the second protrusion 240.

Figure 17:
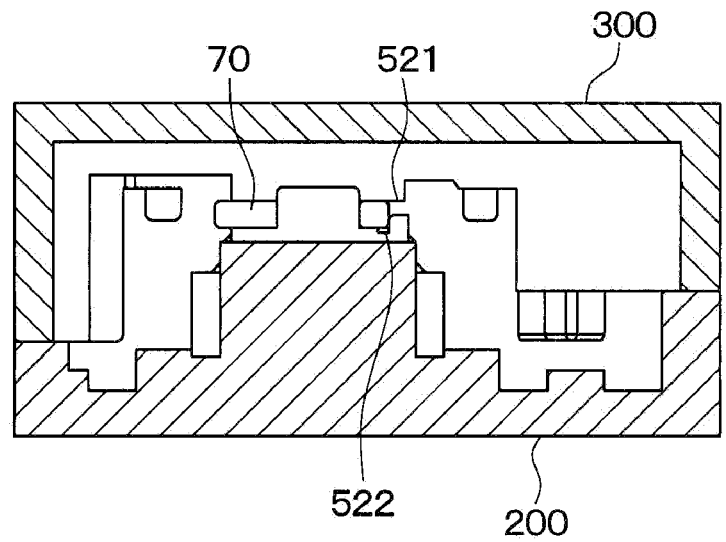
FIG. 17 is a diagram showing a state in which an upper mold is set so as to face the lower mold.

Next, as shown in FIG. 17, the operator sets the upper mold 300, which is the second mold. Specifically, the upper mold 300 is arranged so as to include the plate 70 and face the lower mold 200.

Next, injection molding is performed in S108. Specifically, resin is injected into a space formed between the lower mold 200 and the upper mold 300 to integrally form the plate 70, the yoke 64, the magnet 63, and the resin valve gear 52. At this time, the resin injected into the space formed between the lower mold 200 and the upper mold 300 enters the root recess 250, and a thick portion 522 is formed.

Next, the operator removes the upper mold 300 in S110 and removes the valve gear 52 from the lower mold 200 in S112, and the main injection process is ended.

Figure 19:
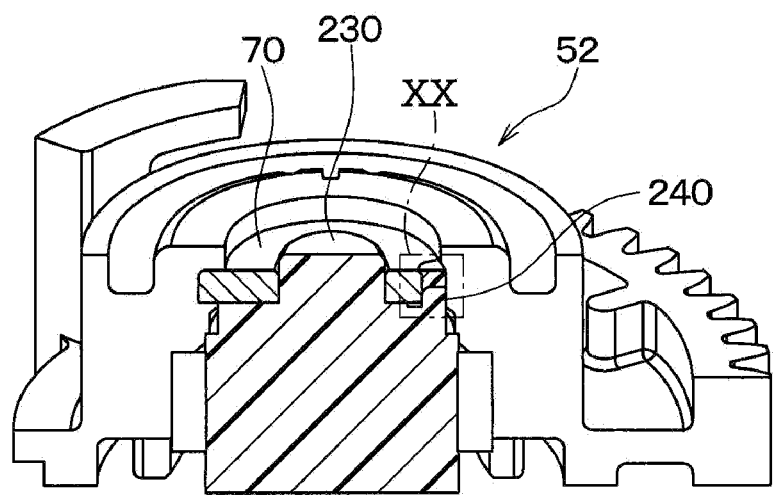
FIG. 19 is a cross-sectional view of the valve gear.
Figure 20:
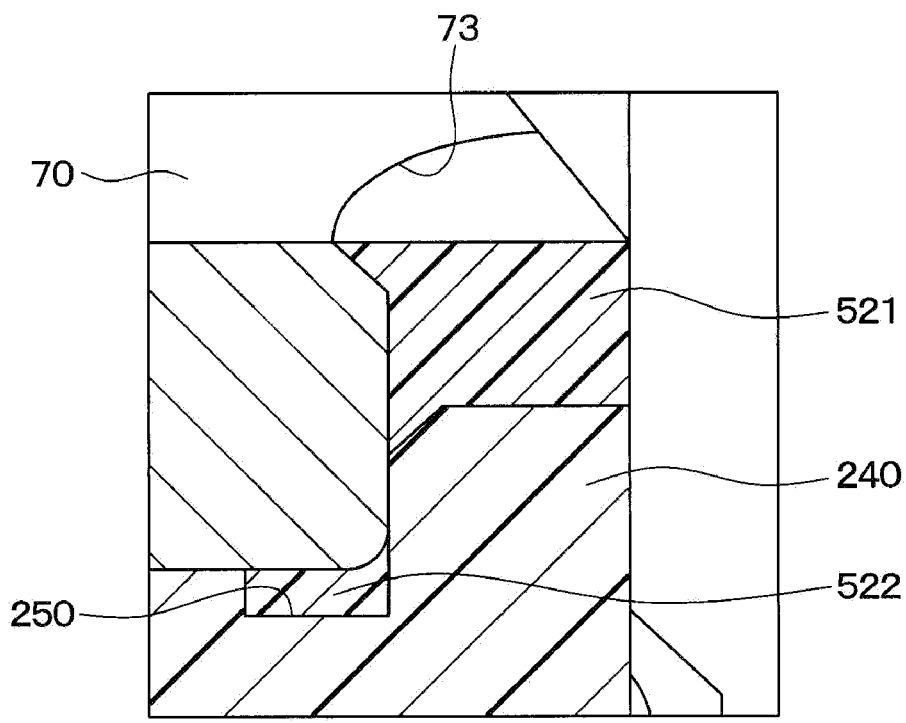
FIG. 20 is an enlarged view of part XX in FIG. 19.

By the way, as shown in FIGS. 19 and 20, the lower mold 200 is formed with a groove-shaped root recess 250 that is recessed downward so as to surround the root of the second protrusion 240. The root recess 250 forms the thick portion 522.

Figure 21:
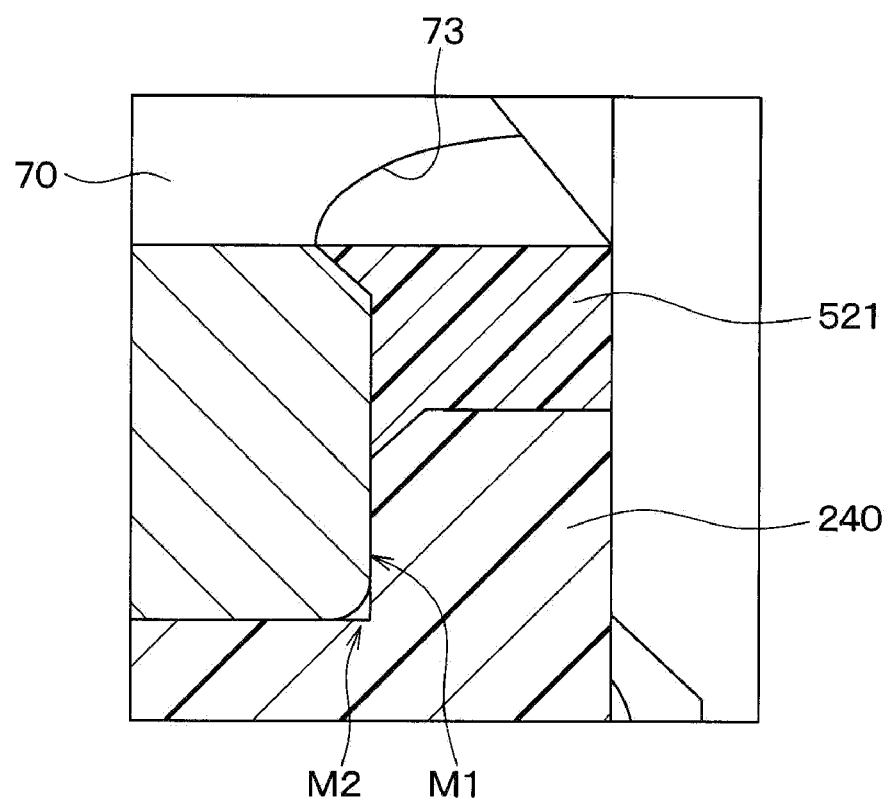
FIG. 21 is a diagram showing a comparative example in which a groove-shaped root recess that is recessed downward so as to surround a root of the second protrusion is not formed in the lower mold.

Here, as shown in FIG. 21, when the root recess 250 is not formed in the lower mold 200, a thin-walled film burr is formed the space between a side surface of the plate 70 and the second protrusion 240 indicated by an arrow M1 and around at the root of the second protrusion 240 indicated by an arrow M2. Then, such film burrs are later peeled off and become a factor of quality deterioration.

In the rotating component of the present embodiment, the thick wall portion 522 is formed by the root recess 250 formed in the lower mold 200, and the thick wall portion 522 and the filling portion 521 formed inside the positioning recess 73 are connected by resin. Therefore, as shown in FIG. 21, it is possible to prevent the film from becoming a burr and peeling off, and the quality can be improved.

Further, if the length of the second protrusion 240 of the lower mold 200 is long, the filling portion 521 becomes like a film burr. Therefore, the length of the second protrusion 240 of the lower mold 200 is such that the wall thickness of the filling portion 521 becomes a predetermined thickness.

As described above, the rotating component includes a metal shaft 30 rotatably supported around the axis, a metal plate 70 fixed to the end portion 31 of the shaft 30, and a resin valve gear 52 integrally formed with the plate by insert molding. Further, the plate 70 is formed with a circular fitting hole 71 that fits with the end portion 31 of the shaft 30, and a positioning recess 73 that is recessed from one side to the other side of the plate 70. The cross section of the end portion 31 of the shaft 30 has a circular shape, and the end portion 31 of the shaft 30 is fitted into the fitting hole 71.

According to the above configuration, the plate 70 is formed with the positioning recess 73 that is recessed from the outer peripheral side of the plate 70 toward the center side of the fitting hole 71. Therefore, the plate 70 can be fixed by using the positioning recess 73. Therefore, it is possible to prevent the plate from rotating when the plate 70 and the valve gear 52 are integrally formed by insert molding.

Further, the end portion 31 of the shaft 30 and the plate 70 are welded along the outer circumference of the end portion 31 of the shaft 30. Therefore, it is possible to sufficiently secure the fastening strength between the shaft 30 and the plate 70.

Further, the rotating component includes a yoke 64 and a magnet 63 configured to form a magnetic circuit by being insert-molded into the valve gear 52. The yoke 64 and the magnet 63 are arranged radially outside the predetermined radius R centered on the axis. Further, the positioning recess 73 is arranged radially inside the predetermined radius R centered on the axis.

According to this configuration, since the plate 70 can be made small, it is possible to prevent the flow of the resin during insert molding from being obstructed. Moreover, since the plate 70 can be made smaller, the plate 70 can be easily set in the mold. Further, the lower mold 200 can be easily removed after the insert molding.

Further, the positioning recess 73 is formed so as to penetrate between one surface and the other surface of the plate 70. The amount of resin that fills into the positioning recess 73 can be increased, and the coupling strength between the plate 70 and the valve gear 52 can be ensured.

Further, the valve gear 52 has the filling portion 521 formed of resin that has filled into the positioning recess 73 of the plate 70. According to this configuration, the coupling strength between the plate 70 and the valve gear 52 can be ensured by the filling portion 521.

Further, the positioning recess functions as a detent for the plate 70 with respect to the valve gear 52. In this way, the positioning recess 73 can also function as the detent for the plate 70 with respect to the valve gear 52.

Further, in the method of manufacturing the rotating component, the metal plate 70 is prepared. The metal plate 70 is formed with the circular fitting hole 71 that fits with the end portion 31 of the metal shaft 30, and the positioning recess 73 that is recessed from the radially outer end toward the center side of the fitting hole 71. Further, the lower mold 200 is prepared. The lower mold 200 has the first protrusion 230 for fitting with the fitting hole 71 of the plate 70 and a second protrusion 240 for fitting with the positioning recess 73 while being formed so as to extend in one direction from the bottom surface 201 side. Further, the operator arranges the plate 70 so that the operator fits the fitting hole 71 of the plate 70 into the first protrusion 230 of the lower mold 200 and fits the positioning recess 73 into the second protrusion 240. Further, the upper mold 300 is arranged so as to include the plate 70 and face the lower mold. Further, resin is injected into a space formed between the lower mold 200 and the upper mold 300 to integrally form the plate 70 and the resin valve gear 52.

According to this configuration, the operator arranges the plate 70 so that the operator fits the fitting hole 71 of the plate 70 into the first protrusion 230 of the lower mold 200 and fits the positioning recess 73 into the second protrusion 240. Then, resin is injected into a space formed between the lower mold 200 and the upper mold 300 to integrally form the plate 70 and the resin valve gear 52.

Therefore, it is possible to prevent the plate 70 from rotating when the plate 70 and the valve gear 52 are integrally formed by insert molding.

Further, the lower mold 200 is formed with a root recess 250 that is recessed in the direction opposite to one direction so as to surround the root of the second protrusion 240. Then, when the resin is injected into the space formed between the lower mold 200 and the upper mold 300 to integrally form the plate 70 and the resin valve gear 52, the resin injected into the space fills the root recess 250, and the thick portion 522 is formed on the valve gear 52.

Therefore, it is possible to suppress the formation of a thin-walled film burr at the root portion of the second protrusion 240.

Second Embodiment

Figure 22:
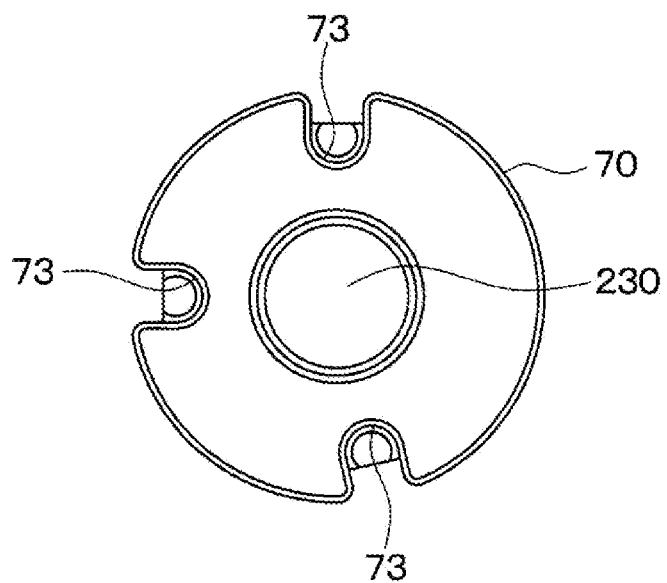
FIG. 22 is a view showing a state in which a plate of a rotating component according to a second embodiment is set in a first protrusion and a second protrusion.

The rotating component according to a second embodiment will be described with reference to FIG. 22. In the rotating component of the first embodiment, the plate 70 is formed with three detent portions 72, but in the rotating component of the present embodiment, the plate 70 is formed with three positioning recesses 73, and the detent portion 72 is not formed on the plate 70.

The filling portion 521 is formed in each of positioning recesses 73 by the resin that has filled during insert molding. Each of positioning recesses 73 also functions as a detent.

As described above, instead of the detent portion 72 of the first embodiment, a plurality of positioning recesses 73 may be configured to function as a detent.

Further, the positions of the plurality of positioning recesses 73 are different, when the plate 70 is turned upside down. That is, the position of the positioning recess 73 when the plate 70 is viewed from one side of the plate 70 and the position of the positioning recess 73 when the plate 70 is viewed from the opposite surface side of the plate 70 are different. Therefore, it is possible to prevent the front and back of the plate 70 from being accidentally set in the lower mold 200.

Third Embodiment

Figure 23:
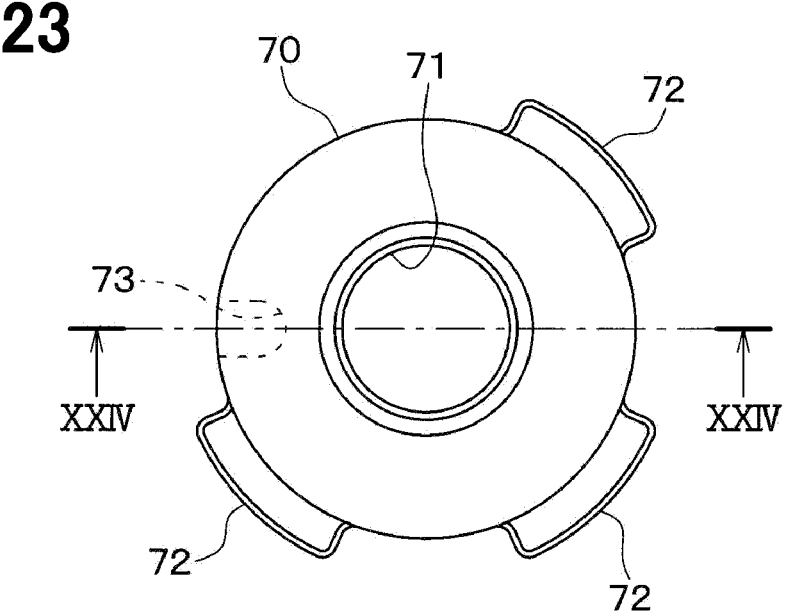
FIG. 23 is a front view of a plate of a rotating component according to a third embodiment.
Figure 24:
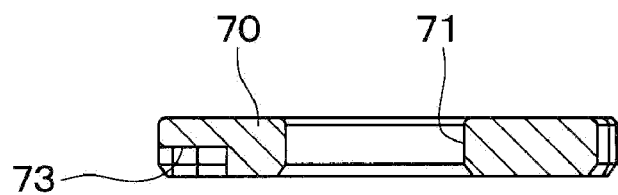
FIG. 24 is a cross-sectional view taken along a line XXIV-XXIV in FIG. 23.

The rotating component according to a third embodiment will be described with reference to FIGS. 23 and 24. In the first embodiment, the positioning recess 73 is formed so as to penetrate between one surface and the other surface of the plate 70. On the other hand, in the present embodiment, the positioning recess 73 is formed so that the space between the lower surface side, which is one surface side, and the upper surface side, which is the other surface side, of the plate 70 is closed. Specifically, the positioning recess 73 is formed so as to be recessed from the lower surface side, which is one surface side of the plate 70, to the upper surface side, which is the other surface side.

In this way, the positioning recess 73 can be formed so as to be recessed from the lower surface side to the upper surface side of the plate 70. According to this configuration, the strength of the plate 70 can be improved as compared with the configuration in which the positioning recess 73 is formed so as to penetrate between one surface and the other surface of the plate 70.

Further, when the positioning recess 73 is formed so as to penetrate between one surface and the other surface of the plate 70, film burrs are likely to be formed due to the wraparound of the resin. On the other hand, when the positioning recess 73 is formed so as not to penetrate between one surface and the other surface of the plate 70 as in the present embodiment, it is possible to prevent the formation of film burrs.

Contrary to the present embodiment, the positioning recess 73 may be formed so as to be recessed from the upper surface side which is the other surface side of the plate 70 to the lower surface side which is the one surface side. Further, the positioning recess 73 may be formed so as to be recessed from the lower surface side to the upper surface side of the plate 70 and recessed from the upper surface side to the lower surface side of the plate 70.

Other Embodiments (1) In the first to third embodiments, the end portion 31 of the shaft 30 and plate 70 are welded together along the outer circumference of the end portion 31 of the shaft 30 in a state where the end portion 31 of the shaft 30 is fitted to the circular fitting hole 71 formed in the plate 70. On the other hand, it is not always necessary to weld the end portion 31 of the shaft 30 and the plate 70 along the outer circumference of the end portion 31 of the shaft 30.

(2) In the first to third embodiments, the rotating component have been described by taking the valve gear 52 including the plate 70 fixed to the end portion 31 of the shaft 30 for driving the valve body 40 as an example. However, it is not limited to rotating component for such application.

The present disclosure is not limited to the above embodiment, and can be appropriately modified within the scope described in the claims. Individual elements or features of a particular embodiment are generally not limited to that particular embodiment, but, where applicable, are interchangeable and can be used in a selected embodiment, even if not specifically shown or described. The constituent element(s) of each of the above embodiments is/are not necessarily essential unless it is specifically stated that the constituent element(s) is/are essential in the above embodiment, or unless the constituent element(s) is/are obviously essential in principle. Furthermore, in each of the above embodiments, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as indispensable or is obviously indispensable in view of the principle of the present disclosure. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

(Overview)

According to a first aspect shown in part or all of each of the above embodiments, the rotating component includes the metal shaft rotatably supported around the axis and the metal plate fixed to the end portion of the shaft. It also includes the resin gear made of resin that is integrally formed with the plate by insert molding. Further, the plate is formed with the circular fitting hole for fitting with the end portion of the shaft, and the positioning recess is formed which is recessed from one side to the other side of the plate. Further, the cross section of the end portion of the shaft has a circular shape, and the end portion of the shaft is fitted into the fitting hole.

Further, according to a second aspect, the end portion of the shaft and the plate are welded together along the outer circumference of the end portion of the shaft. Therefore, the fastening strength between the shaft and the plate can be sufficiently ensured.

Further, according to a third aspect, the rotating component includes the yoke and the magnet for forming a magnetic circuit by being insert-molded into the resin gear. Further, the yoke and the magnet are arranged radially outside from the predetermined radius centered on the axis. Further, the positioning recess is arranged radially inside the predetermined radius centered on the axis.

According to this configuration, since the plate can be made small, it is possible to prevent the flow of the resin during insert molding from being obstructed. Moreover, since the plate can be made smaller, the plate can be easily set in the mold. Further, the mold can be easily removed after the insert molding.

Further, according to a fourth aspect, the positioning recess is formed so as to penetrate between one surface and the other surface of the plate. Therefore, the amount of resin that fills into the positioning recess can be increased, and the coupling strength between the plate and the valve gear can be ensured.

Further, according to a fifth aspect, the positioning recess is formed so as to be recessed from one surface side to the other surface side of the plate or from the other surface side to the one surface side of the plate.

According to this configuration, the strength of the plate can be improved as compared with the configuration in which the positioning recess is formed so as to penetrate between one surface and the other surface of the plate. Further, when the positioning recess is formed so as to penetrate between one surface and the other surface of the plate, film burrs are likely to be formed due to the wraparound of the resin. On the other hand, when the positioning recess is formed so as not to penetrate between one surface and the other surface of the plate, it is possible to prevent the formation of film burrs.

Further, according to a sixth aspect, the resin gear has the filling portion formed by the resin that has filled into the positioning recess of the plate. According to this configuration, the coupling strength between the plate and the resin gear can be ensured by the filling portion.

Further, according to a seventh aspect, the positioning recess functions as a detent for the plate with respect to the resin gear. In this way, the positioning recess can also function as the detent for the plate with respect to the valve gear.

Further, according to the eighth aspect, in the method of manufacturing the rotating component, the metal plate is prepared. The metal plate is formed with the circular fitting hole that fits with the end portion of the metal shaft, and the positioning recess that is recessed from the radially outer end toward the center side of the fitting hole. Further, the lower mold is prepared. The lower mold has the first protrusion for fitting with the fitting hole of the plate and a second protrusion for fitting with the positioning recess while being formed so as to extend in one direction from the bottom surface side. Further, the operator arranges so that the operator fits the fitting hole of the plate into the first protrusion of the lower mold and fits the positioning recess into the second protrusion. Further, the upper mold is arranged so as to include the plate and face the lower mold. Further, resin is injected into the space formed between the lower mold and the upper mold to integrally form the plate and the resin valve gear.

According to this configuration, the plate and the resin gear are integrally formed by injecting resin into the space formed between the lower mold and the upper mold, in a state where the plate is arranged so that the fitting hole of the plate is fitted into the first protrusion of the lower mold and the positioning recess is fitted into the second protrusion.

Therefore, it is possible to prevent the plate from rotating when the plate and the resin gear are integrally formed by insert molding.

Further, according to a ninth aspect, the lower mold is formed with the root recess that is recessed in the direction opposite to one direction so as to surround the root of the second protrusion. Then, when the resin is injected into the space formed between the lower mold and the upper mold to integrally form the plate and the resin gear, the resin injected into the space fills the root recess, and the thick portion is formed on the resin gear. Therefore, it is possible to suppress the formation of a thin-walled film burr at the root portion of the second protrusion.

What is claimed is:

1. A rotating component, comprising:
    a metal shaft configured to be rotatably supported around an axis;
    a metal plate fixed to an end portion of the shaft; and
    a resin gear made of resin formed integrally with the plate by insert molding,
    wherein
    the plate is formed with a circular fitting hole that fits with the end portion of the shaft, and a positioning recess that is recessed from one side to the other side of the plate,
    a cross section of the end portion of the shaft has a circular shape, and the end portion of the shaft is fitted into the fitting hole; and
    a yoke and a magnet configured to form a magnet circuit by being insert-molded into the resin gear, wherein
    the yoke and the magnet are arranged radially outside a predetermined radius centered on the axis; and
    the positioning recess is arranged entirely radially inside the predetermined radius centered on the axis.

2. The rotating component according to claim 1, wherein the end portion of the shaft and the plate are welded along an outer circumference of the end portion of the shaft.

3. The rotating component according to claim 1, wherein the positioning recess is formed so as to penetrate between one surface side and the other surface side of the plate.

4. The rotating component according to claim 1, wherein the positioning recess is formed so as to close between one surface side and the other surface side of the plate.

5. The rotating component according to claim 1, wherein the resin gear has a filling portion formed of resin that has filled into the positioning recess of the plate.

6. The rotating component according to claim 5, wherein the positioning recess functions as a detent for the plate with respect to the resin gear.

7. A method for manufacturing a rotating component, comprising:
    a step of preparing a metal plate, the metal plate being formed with a circular fitting hole that fits with an end portion of a shaft, and a positioning recess that is recessed from one side to the other side of the plate;
    a step of preparing a lower mold, the lower mold having a first protrusion for fitting with the fitting hole of the plate and a second protrusion for fitting with the positioning recess while being formed so as to extend in one direction from a bottom surface side;
    a step of arranging the plate so that the fitting hole of the plate is fitted into the first protrusion of the lower mold and the positioning recess is fitted into the second protrusion;
    a step of arranging an upper mold so as to include the plate and face the lower mold; and
    a step of forming integrally the plate and a resin gear made of resin by injecting resin a space between the lower mold and the upper mold; wherein
    a cross section of the end portion of the shaft has a circular shape, and the end portion of the shaft is fitted into the fitting hole;
    a yoke and a magnet are configured to form a magnet circuit by being insert-molded into the resin gear;
    the yoke and the magnet are arranged radially outside a predetermined radius centered on the axis; and
    the positioning recess is arranged entirely radially inside the predetermined radius centered on the axis.

8. The method for manufacturing the rotating component according to claim 7, wherein
    the lower mold is formed with a root recess that is recessed in the direction opposite to one direction so as to surround a root of the second protrusion, and
    when the resin is injected into a space formed between the lower mold and the upper mold to integrally form the plate and the resin gear, the resin injected into the space fills into the root recess, and a thick portion is formed on the resin gear.

* * * * *